(12) United States Patent
Sehanobish et al.

(10) Patent No.: US 7,638,007 B2
(45) Date of Patent: Dec. 29, 2009

(54) METHOD FOR JOINING SUBSTRATES AND OBJECTS

(75) Inventors: Kalyan Sehanobish, Rochester Hills, MI (US); Daniel James Falla, Sarnia (CA); Shaofu Wu, Sugar Land, TX (US); Mark F. Sonnenschein, Midland, MI (US)

(73) Assignee: Dow Global Technologies, Inc, Midland, MI (US)

( * ) Notice: Subject to any disclaimer, the term of this patent is extended or adjusted under 35 U.S.C. 154(b) by 532 days.

(21) Appl. No.: 10/565,575

(22) PCT Filed: Aug. 13, 2004

(86) PCT No.: PCT/US2004/026275

§ 371 (c)(1), (2), (4) Date: Jul. 24, 2006

(87) PCT Pub. No.: WO2005/017005

PCT Pub. Date: Feb. 24, 2005

(65) Prior Publication Data

US 2006/0266476 A1 Nov. 30, 2006

(51) Int. Cl.
| B32B 37/12 | (2006.01) |
| B32B 43/00 | (2006.01) |
| B32B 9/00 | (2006.01) |
| B29C 65/54 | (2006.01) |
| C09J 5/02 | (2006.01) |
| E04B 7/00 | (2006.01) |
| E04B 1/00 | (2006.01) |
| E04G 23/02 | (2006.01) |

(52) U.S. Cl. .................. 156/71; 156/94; 156/307.1; 156/307.3; 428/355 R; 428/411.1; 52/90.2; 52/746.11

(58) Field of Classification Search .............. 156/71, 156/272.2, 273.5, 297, 304.1, 94, 307.1, 156/307.3, 307.7; 428/411.1, 500, 513, 355 R; 52/90.1, 90.2, 746.11
See application file for complete search history.

(56) References Cited

U.S. PATENT DOCUMENTS

| 3,275,611 A | 9/1966 | Mottus et al. |
| 3,645,992 A | 2/1972 | Elston |
| 3,726,754 A * | 4/1973 | Coglianese et al. ...... 428/317.7 |
| 4,076,698 A | 2/1978 | Anderson et al. |
| 5,055,438 A | 10/1991 | Canich |
| 5,064,802 A | 11/1991 | Stevens et al. |
| 5,106,928 A | 4/1992 | Skoultchi et al. |
| 5,272,236 A | 12/1993 | Lai et al. |
| 5,278,272 A | 1/1994 | Lai et al. |
| 5,286,821 A | 2/1994 | Skoultchi |
| 5,310,835 A | 5/1994 | Skoultchi et al. |
| 5,376,746 A | 12/1994 | Skoultchi |
| 5,539,070 A | 7/1996 | Zharov et al. |
| 5,616,796 A | 4/1997 | Pocius et al. |
| 5,621,143 A | 4/1997 | Pocius |
| 5,665,800 A | 9/1997 | Lai et al. |
| 5,681,910 A | 10/1997 | Pocius |
| 5,686,544 A | 11/1997 | Pocius |
| 5,690,780 A | 11/1997 | Zharov et al. |
| 5,691,065 A | 11/1997 | Zharov et al. |
| 5,718,977 A | 2/1998 | Pocius |
| 5,795,657 A | 8/1998 | Pocius et al. |
| 5,844,045 A | 12/1998 | Kolthammer et al. |
| 5,872,197 A | 2/1999 | Deviny |
| 6,710,145 B2 | 3/2004 | Sonnenschein et al. |
| 6,730,759 B2 | 5/2004 | Sonnenschein et al. |
| 6,740,716 B2 | 5/2004 | Webb et al. |
| 6,762,260 B2 | 7/2004 | Sonnenschein et al. |
| 6,777,512 B1 | 8/2004 | Sonnenschein et al. |
| 6,787,608 B2 | 9/2004 | VanDun et al. |
| 6,806,330 B1 | 10/2004 | Sonnenschein et al. |
| 2002/0033227 A1 * | 3/2002 | Sonnenschein et al. .. 156/306.9 |
| 2003/0044553 A1 | 3/2003 | Ramanathan et al. |
| 2004/0096610 A1 | 5/2004 | Ramanathan et al. |
| 2006/0191623 A1 | 8/2006 | Lutz et al. |

FOREIGN PATENT DOCUMENTS

| EP | 0405798 | 1/1991 |
| WO | WO-9910424 | 3/1999 |
| WO | WO-0069965 | 11/2000 |
| WO | WO-0233227 | 4/2002 |
| WO | WO-03033585 | 4/2003 |
| WO | WO-03038006 | 5/2003 |
| WO | WO-2004/078871 | 9/2004 |

* cited by examiner

Primary Examiner—Philip C Tucker
Assistant Examiner—Sing P Chan

(57) ABSTRACT

A method to join a substrate to an object is disclosed using a curable one or two part adhesive composition comprising an effective amount of a stabilized organoborane amine complex initiator and one or more monomers, oligomers, polymers or mixtures thereof having olefinic unsaturation which is capable of polymerization by free radical polymerization.

22 Claims, No Drawings

METHOD FOR JOINING SUBSTRATES AND OBJECTS

The present invention relates generally to a method for joining a substrate having a first surface to an object having a second surface. The method is especially effective for joining roofing membranes together, joining roofing membranes to roof substrates, and for joining pipe components. The method uses a curable one or two part adhesive composition comprising an organoboron complex initiator system and one or more monomers, oligomers, polymers or mixtures thereof having olefinic unsaturation which is capable of polymerization by free radical polymerization.

Thermoplastic polymers are used widely to manufacture articles such as roofing membranes. Articles such as pipes and pipe fittings, which require good corrosion and chemical resistance, low weight and good fabricability for use in transportation of gases, liquids, solids, slurries or the likes under pressure and non-pressure conditions or for protection of sensitive components, such as fiber-optics or cables are also made from thermoplastic polymers. These applications frequently require connections between layers, pipes and/or other objects. The joining of articles made of thermoplastic material may be accomplished by mechanical means such as threaded connections, couplings, flanges; chemical means such as solvent cementing; or by thermal means such as fusion bonding Mechanical joints generally work well for articles such as small diameter pipes and non-pressure applications, but they are not cost competitive or technically suitable for large diameter pipe and/or pressure piping systems.

Solvent cementing is widely utilized for some thermoplastics, for example for polyvinylchloride pipe and fittings. Typically solvent bonding utilizes a solvent-based primer or cleaner to prepare the surfaces to be bonded and a solvent cement system that contains solvent(s) and resin in conjunction with an interference fit joint. Solvent cements may be used without primers or cleaners, however joint integrity may be compromised. However, interference fit joints limit the ability to accurately lay out the pipe and fittings prior to cementing. Adhesive primers are widely used with solvent-based cement systems for poly(vinylchloride) and chlorinated poly(vinylchloride) piping systems to insure acceptable joint bonding. However, primers release as much as 650 grams per liter of volatile organic compounds (VOCs) into the environment. Moreover, the bonding strength can be inconsistent and solvent-based systems do not work well with many thermoplastic pipes and fitting materials, for example polyolefins.

For roofing systems, the material of choice is typically polyvinylchloride (PVC) and polyolefins. The major bonding of the plies in the roofing industry is thermal, i.e., performed by heat guns. Use of hand held heat guns is a very slow process and often produces a poor seal, even though the materials, if properly and economically sealed could withstand the vigors of the environment. Unfortunately, this approach does not work well in complicated areas, edges, and bends. Current adhesive systems for low surface energy materials such as polyethylene and polypropylene (surface energies from 16 to 30 mJ/m² at 24° C.) cannot adequately bond the materials. However, adhesive sealing such as that claimed herein could be used for seam joining as well as membrane installation around flashing, pipes and other obstacles on a roof. Having an adhesive system such as that claimed herein could improve seal integrity, reduce priming and cleaning operations, and reduce labor costs. The adhesive system of the invention offers high strength, toughness and flexibility, chemical resistance, simple and unique joint integrity, minimal long term maintenance, and quick, easy installation in bonding simple roofing plies to complicated bends.

Accordingly, there has been a need for a process to form extensive, continuous economical, and strong joints between thermoplastic, especially polyolefin, articles with lower VOC emissions and which is convenient and economical. The present invention fulfills this need.

The present invention discloses a method for joining a substrate having a first surface to an object having a second surface comprising the steps of:
  (i) applying an effective amount of a curable adhesive composition to the first surface of the substrate, the second surface of the object or to both surfaces, wherein the adhesive comprises
    (a) an effective amount of a organoborane amine complex initiator and
    (b) one or more monomers, oligomers, polymers or mixtures thereof having olefinic unsaturation which is capable of polymerization by free radical polymerization and
  (ii) contacting the first surface of the substrate with the second surface of the object.

Another embodiment of the present invention is a method to repair a new or existing substrate, object, or substrate/object joint having one or more surface in need of repair comprising the steps of
  (i) applying an effective amount of a curable one or two part adhesive composition to the surface(s) in need of repair, or a repair patch or both the surface needing repair and the repair patch, wherein the adhesive comprises
    (a) an effective amount of a organoborane amine complex initiator and
    (b) one or more monomers, oligomers, polymers or mixtures thereof having olefinic unsaturation which is capable of polymerization by free radical polymerization.

and
  (ii) bonding a repair patch to the surface in need of repair.

Yet another embodiment of the present invention is a substrate having a first surface bonded to an object having a second surface, wherein the first surface is bonded to the second surface with an effective amount of a curable one or two part adhesive composition, wherein the adhesive comprises:
  (a) an effective amount of a organoborane amine complex initiator and
  (b) one or more monomers, oligomers, polymers or mixtures thereof having olefinic unsaturation which is capable of polymerization by free radical polymerization.

The organoborane amine complex initiator can be represented by the formula

wherein B represents Boron; and $R^2$ is separately in each occurrence a $C_{1-10}$ alkyl, $C_{3-10}$ cycloalkyl, or two or more of $R^2$ may combine to form a cycloaliphatic ring. Preferably $R^2$ is $C_{1-4}$ alkyl, even more preferably $C_{2-4}$ alkyl, and most preferably $C_{3-4}$ alkyl. Among preferred organoboranes are triethyl borane, tri-isopropyl borane and tri-n-butylborane.

The amine can be a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amines; heterocylic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines or a mixture thereof.

In yet another embodiment of the present invention, the adhesive composition further comprises an effective amount of an isocyanate containing compound; one or more unpolymerized or partially polymerized compound having ring opening heterocyclic moieties and optionally a Lewis acid catalyst capable of initiating polymerization of the compound containing heterocyclic moieties; one or more compound, oligomer or prepolymer having siloxane groups and reactive moieties in its backbone capable of polymerization; one or more compound, oligomer or prepolymer having siloxane groups in its backbone which contain a moiety which when exposed to moisture forms an acid capable of decomplexing the organoborane amine complex; or mixtures thereof.

Any substrate and object capable of being joined are suitable for the present invention. Membranes joined together (e.g., roofing membranes), membranes joined to a substrate (e.g., a roofing material), or pipes joined together or to pipe fittings are particularly suitable for the present invention.

Membranes, such as roofing membranes, can comprise various thermoplastic polymers, as described above, and can be made from blends of such polymers. Examples of such membranes are shown in WO 03/033585 (PCT/US02/27968) and in WO 00/69965 (PCT/US00/13359).

Polyethylene is particularly suitable for use in the present invention, preferably low density polyethylene (LDPE), linear low density polyethylene (LLDPE), medium density polyethylene (MDPE), high density polyethylene (HDPE), crossed-linked polyethylene (PEX). The polyethylene can be a homopolymer, a copolymer with an alpha-olefin or a mixture thereof. Mixtures of polyethylene can include a mixture of a Ziegler-Natta polymerized poyethylene and a metallocene polyethylene, such as that disclosed in U.S. Pat. No. 5,844,045. Preferable alpha-olefins are $C_3$ to $C_{20}$ alpha-olefins, more preferably propylene, 1-butene, methyl-4-pentene, 1-hexene, and 1-octene. Ethylene/alpha-olefin/diene polymers are also useful in the present invention. These are commonly referred to as EPDM. The diene can be any which is effectively interpolymerized with the ethylene and alpha-olefin, although ethylidene norbornene is preferred.

Methods to make polyethylene are well known and include using various polymerization techniques, including high pressure free radical polymerization processes, solution processes, slurry processes and gas phase processes. Solution processes such as that disclosed in U.S. Pat. No. 4,076,698 are suitable. U.S. Pat. No. 4,076,698 discloses heterogeneously branched polyethylene having a relatively broad molecular weight distribution (MWD). Catalyst systems for the various polymerization processes include Ziegler Natta catalyst technology, such as that shown in U.S. Pat. No. 4,076,698, but also include single site catalyst technology, such as that disclosed in U.S. Pat. Nos. 3,645,992 and 5,064,802 (constrained geometry catalyst technology). The technology disclosed in U.S. Pat. No. 3,645,992 results in homogeneously branched linear polyethylene having a very narrow MWD. The catalyst technology of U.S. Pat. No. 5,064,802, when used in a continuous polymerization process, results in substantially linear polyethylene (having long chain branching levels of 0.01-3 long chain branches per 1000 carbons, but also having a very narrow MWD). Other (metallocene) catalyst technology includes that disclosed in U.S. Pat. Nos. 5,026,798 and 5,055,438. Examples of the substantially linear polyethylene can be found in U.S. Pat. Nos. 5,272,236; 5,278,272; and 5,665,800. All of the cited United States patents are hereby incorporated by reference in their entirety. A preferred polyethylene is disclosed in pending U.S. application Ser. No. 10/222273 hereby incorporated by reference.

Lower viscosity polyethylene may preferably be employed, for example, for injection molding. The melt flow rate (MFR) of the lower viscosity polyethylene useful in the present invention is generally equal to or greater than 1 gram/10 minutes (g/10 min.), preferably equal to or greater than 2 g/10 min., more preferably equal to or greater than 5 g/10 min., and most preferably equal to or greater than 10 g/10 min. The melt flow rate for lower viscosity polyethylene useful for the present invention is generally equal to or less than 1000 g/10 min., preferably equal to or less than 500 g/10 min., and most preferably equal to or less than 50 g/10 min. Unless otherwise stated, melt flow rate for lower viscosity PE resins is determined according to ASTM D 1238 at 190° C. and an applied load of 2.16 kilogram (kg).

Alternatively, a higher viscosity polyethylene may preferably be employed, for example, for blow molding, rotational molding and extrusion. The MFR of the higher viscosity polyethylene useful in the present invention is generally equal to or greater than 0.1 g/10 min., preferably equal to or greater than 0.2 g/10 min., more preferably equal to or greater than 0.3 g/10 min., and most preferably equal to or greater than 0.4 g/10 min. The melt flow rate of the higher viscosity polyethylene useful herein for extrusion is generally equal to or less than 2 g/10 min., preferably equal to or less than 1 g/10 min., more preferably equal to or less than 0.8 g/10 min., and most preferably equal to or less than 0.6 g/10 min. Melt flow rate for the higher viscosity PE is determined according to ASTM D 1238 at 190° C. and an applied load of 5 kg.

Similarly, functionalized polymers can be bonded using the invention. These functionalized polymers include maleic anhydride grafted polyolefins, carboxylic acid functionalized polymers, such as ethylene/acrylic acid and ethylene/methacrylic acid, and ionomers made therefrom.

The polypropylene suitable for use in this invention is well known in the literature and can be prepared by known techniques. In general, the polypropylene is in the isotatic form, although other forms can also be used (for example, syndiotatic or atactic). The polypropylene used for the present invention is preferably a homopolymer of polypropylene or a copolymer, for example, a random or block copolymer, of propylene and an alpha-olefin, preferably a $C_2$, or $C_4$ to $C_{20}$ alpha-olefin. Preferred alpha-olefins for constituting the propylene and alpha-olefin copolymer include ethylene, 1-butene, 4-methylpentene, 1-hexene, and 1-octene. The alpha-olefin is present in the polypropylene of the present invention in an amount equal to or less than 20 percent by mole, preferably equal to or less than 15 percent, even more preferably equal to or less than 10 percent and most preferably equal to or less than 5 percent by mole.

A preferred polypropylene is an isotactic polypropylene having a high degree of crystallinity. A preferable method of determining the degree of crystallinity in polypropylene is by differential scanning calorimetry (DSC). As defined herein, a high degree of crystallinity, as determined by DSC, is at least 40 weight percent, more preferably at least 50 weight percent, even more preferably at least 62 weight percent, even more preferably at least 64 weight percent and most preferably at least 68 weight percent based on the weight of the polypropylene. The degree of crystallinity for the polypropylene as determined by DSC is less than or equal to 100 weight percent, preferably less than or equal to 90 weight percent, more preferably less than or equal to 80 weight percent, and most preferably less than or equal to 70 weight percent based on the weight of the polypropylene.

A preferred polypropylene is a coupled polypropylene. For the purpose of coupling, the polypropylene is reacted with a polyfunctional compound which is capable of insertion reactions into carbon-hydrogen bonds. Compounds having at least two functional groups capable of insertion into the carbon-hydrogen bonds of CH, $CH_2$, or $CH_3$ groups, both aliphatic and aromatic, of a polymer chain are referred to herein as coupling agents. A preferred coupling agent is a poly (sulfonyl azide), more preferably a bis(sulfonyl azide). Examples of poly(sulfonyl azides) useful for the invention are described in WO 99/10424. Preferred poly(sulfonyl azide)s include 4,4'oxy-bis-(sulfonylazido)benzene, 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

One skilled in the art knows that an effective amount of coupling agent is dependent on the coupling agent selected and the average molecular weight of the polypropylene. Typically, the lower the molecular weight of the polypropylene, the more coupling agent needed. An effective amount of coupling agent is an amount sufficient to result in adequate melt strength for forming pipe and/or fittings, but less than a cross-linking amount. Generally, an effective amount of poly (sulfonyl azide) for coupling is equal to or greater than 50 parts per million (ppm), preferably equal to or greater than 75 ppm, more preferably equal to or greater than 100 ppm and most preferably equal to or greater than 150 ppm by weight based on the weight of the polypropylene. Formation of cross-linked polypropylene is to be avoided, therefore the amount of bis(sulfonyl azide) is limited to equal to or less than 2000 ppm, preferably equal to or less than 1500 ppm and more preferably equal to or less than 1300 ppm by weight based on the weight of the polypropylene.

Lower viscosity polypropylene may preferably be employed, for example, for injection molding. The MFR of the lower viscosity polypropylene useful in the present is generally equal to or greater than 1 g/10 min., preferably equal to or greater than 5 g/10 min., and most preferably equal to or greater than 10 g/10 min. The melt flow rate for the lower viscosity polypropylene useful herein for injection molding is generally equal to or less than 50 g/10 min., preferably equal to or less than 40 g/10 min., and most preferably equal to or less than 35 g/10 min. Unless otherwise stated, melt flow rate for polypropylene is determined according to ASTM D 1238 at 230° C. and an applied load of 2.16 kg.

Alternatively, higher viscosity polypropylene may preferably be employed, for example, for blow molding, rotational molding and extrusion. The MFR of the higher viscosity polypropylene useful in the present invention is generally equal to or greater than 0.1 g/10 min., preferably equal to or greater than 0.2 g/10 min., and most preferably equal to or greater than 0.5 g/10 min. The melt flow rate of the higher viscosity polypropylene useful herein is generally equal to or less than 10 g/10 min., preferably equal to or less than 5 g/10 min., and most preferably equal to or less than 1 g/10 min.

The adhesive for joining the substrate and the object of the present invention can be a one part curable composition or a two part curable composition as those terms are known in the art. A one part adhesive composition will comprise an effective amount of a stabilized organoborane amine complex initiator and a polymerizable monomer. A two part adhesive composition will comprise in one part an effective amount of a stabilized organoborane amine complex initiator and in another part a polymerizable monomer. Such adhesives are known in the art, see U.S. Pat. Nos. 5,106,928; 5,286,821; 5,310,835; 5,376,746; 5,539,070; 5,690,780; 5,691,065; 5,616,796; 5,621,143; 5,681,910; 5,686,544; 5718,977; 5,795,657; 5,686,544; and U.S. patent applications Ser. Nos. 09/466321; 10/012629; 10/095326; and 10/377440.

The organoborane used in the complex is a trialkyl borane or an alkyl cycloalkyl borane. Preferably such borane corresponds to the formula

wherein B represents Boron; and $R^2$ is separately in each occurrence a $C_{1-10}$ alkyl, $C_{3-10}$ cycloalkyl, or two or more of $R^2$ may combine to form a cycloaliphatic ring. Preferably $R^2$ is $C_{1-4}$ alkyl, even more preferably $C_{2-4}$ alkyl, and most preferably $C_{3-4}$ alkyl. Among preferred organoboranes are triethyl borane, tri-isopropyl borane and tri-n-butylborane.

The amines used to complex the organoborane compound can be any amine or mixture of amines which complex the organoborane and which can be decomplexed when exposed to a decomplexing agent. The desirability of the use of a given amine in an amine/organoborane complex can be calculated from the energy difference between the Lewis acid-base complex and the sum of energies of the isolated Lewis acid (organoborane) and base (amine) known as binding energy. The more negative the binding energy the more stable the complex.

Preferred amines include primary amines; secondary amines; polyamines having primary or secondary amines or both; ammonia; polyoxyalkylene amines; the reaction product of a diamine and a difunctional compound having moieties which react with an amine, wherein the reaction product has terminal amine groups; aryl amines; heterocylic amines; compounds having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines or a mixture thereof.

Most preferred amines are selected from the group of amines having an amidine structural component; aliphatic heterocycles having at least one nitrogen in the heterocyclic ring wherein the heterocyclic compound may also contain one or more nitrogen atoms, oxygen atoms, sulfur atoms, or double bonds in the heterocycle; an alicyclic compound having bound to the ring a substituent having an amine moiety wherein the alicyclic compound may have a second substituent which can contain one or more nitrogen, oxygen or sulfur atoms and/or one or two double bonds; primary amines which in addition to a primary amine have one or more hydrogen bond accepting groups of an ether, polyether, thioether or halogen wherein there is an alkylene chain of at least two carbon atoms between the primary amine and the hydrogen bond accepting group, and conjugated imines. For example, the complex of the organoborane and the primary amine corresponds to the formula

the organoborane heterocyclic amine complex corresponds to the formula

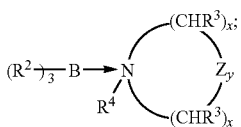

the organoborane amidine complex corresponds to the formula

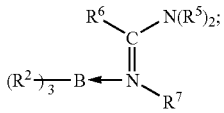

the organoborane conjugated immune complex corresponds to the formula

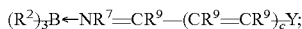

and the amine substituted alicyclic compound complex corresponds to the formula

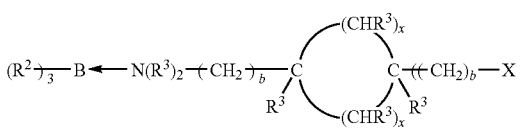

wherein

B is boron;

$R^1$ is separately in each occurrence hydrogen, a $C_{1-10}$ alkyl or $C_{3-10}$ cycloalkyl;

$R^2$ is separately in each occurrence a $C_{1-10}$ alkyl, $C_{3-10}$ cycloalkyl or two or more of $R^2$ may combine to form a cycloaliphatic ring structure;

$R^3$ is separately in each occurrence hydrogen, a $C_{1-10}$ alkyl, $C_{3-10}$ cycloalkyl or forms a double bond with a $R^3$ or $R^4$ on an adjacent atom;

$R^4$ is separately in each occurrence hydrogen, $C_{1-10}$ alkyl, $C_{3-10}$ cycloalkyl, $C_{6-10}$ aryl or $C_{6-10}$ alkaryl;

$R^5$ and $R^6$ are separately in each occurrence hydrogen, $C_{1-10}$ alkyl, $C_{3-10}$ cycloalkyl, $N(R^4)_2$ wherein $R^7$ is separately in each occurrence hydrogen, $C_{1-10}$ alkyl, $C_{3-10}$ cycloalkyl or two or more of $R^5$, $R^6$ and $R^7$ in any combination can combine to form a ring structure which can be a single ring or a multiple ring structure and the ring structure can include one or more of nitrogen, oxygen or unsaturation in the ring structure;

$R^9$ is independently in each occurrence hydrogen, $C_{1-10}$ alkyl or $C_{3-10}$ cycloalkyl, Y, —$C(R^9)_2$—$(CR^9$=$CR^9)_c$—Y or two or more of $R^9$ can combine to form a ring structure, or one or more of $R^9$ can form a ring structure with Y provided the ring structure is conjugated with respect to the double bond of the imine nitrogen;

$R^{10}$ is separately in each occurrence $C_{1-10}$ alkyl, $C_{3-10}$ cycloalkyl or —$(C(R^1)_2)_d$—W;

W is separately in each occurrence hydrogen, $C_{1-10}$ alkyl or X;

X is $OR^{10}$, $SR^{10}$ or a halogen;

Y is independently in each occurrence hydrogen, $SR^4$, $N(R^4)_2$, $OR^4$, $C(O)OR^4$, a halogen or an alkylene group which forms a cyclic ring with $R^7$ or $R^9$;

Z is separately in each occurrence oxygen or —$NR_4$;

a is separately in each occurrence an integer of from 1 to 10;

b is separately in each occurrence 0 or 1, with the proviso that the sum of a and b should be from 2 to 10;

c is separately in each occurrence an integer of from 1 to 10;

d is separately in each occurrence an integer of 1 to 4;

x is separately in each occurrence an integer of 1 to 10, with the proviso that the total of all occurrences of x is from 2 to 10; and y is separately in each occurrence 0 or 1.

In another preferred embodiment the amine further contains siloxane, that is an amino siloxane. Any compound with both amine and siloxane units wherein the amine has sufficient binding energy as described hereinbefore with the organoborane, may be used. Preferably the siloxane moiety will permit this component to participate in polymerization of the siloxane monomers, oligomers, and/or polymers. The siloxane containing monomers, oligomers, and/or polymers can be any compound which contains silicone. Preferably the siloxane compound has reactive functionality. Preferable reactive functionalities include hydride, olefinic unsaturation, hydroxyl, and hydrolyzable moieties that hydrolyze to form a silanol moiety. The adhesive composition my further comprise a catalyst for the polymerization of the one or more compounds, oligomers or prepolymers having a siloxane backbone and reactive moieties capable of polymerization.

Preferred amino siloxanes are represented by one of the formulas:

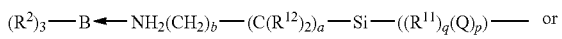
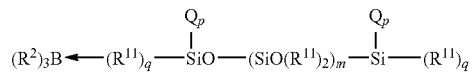

wherein

B represents Boron;

$R^2$ is separately in each occurrence $C_{1-10}$ alkyl, $C_{3-10}$ cycloalkyl, or two or more of $R^2$ may combine to form a cycloaliphatic ring;

Q is a hydrolyzable moiety;

$R^{11}$ is independently in each occurrence hydrogen, alkyl, alkoxy, alkenyl, alkyl amino or corresponds to the formula $((CR^{14}H)_rO)_n$—$(NR^4)$—$(CH_2)_o$—$NH_2$ with the proviso that at least $(R^{11})'$ is a primary amine leave this as is;

$R^{12}$ is independently in each occurrence hydrogen, alkyl, aryl, alkoxy, and may further contain one or more primary, secondary or tertiary amines;

$R^{14}$ is separately in each occurrence hydrogen or alkyl;

$R^4$ is hydrogen, $C_{1-10}$ alkyl, $C_{6-10}$ aryl or $C_{7-10}$ alkaryl;

a is a number of form 1 to 10;

b is a number of from 0 to 1;

m is separately in each occurrence a whole number of 1 or greater;

p is separately in each occurrence a number of from 1 to 3;

q is separately in each occurrence an integer from 1 to 2 wherein the sum of p and q on each silicon atom is 3;

n is separately in each occurrence an integer of 4 to 400;

o is separately in each occurrence an integer of 1 to 9; and r is separately in each occurrence an integer of 2 or 4.

Polymerizable compounds which may be used in the adhesive compositions of the invention include any monomers, oligomers, polymers or mixtures thereof which contain olefinic unsaturation which can polymerize by free radical polymerization. Such compounds are well known to those skilled in the art and are described in U.S. Pat. No. 3,275,611. Among preferred classes of compounds containing olefinic unsaturation are monomers, oligomers, polymers and mixtures thereof derived from the acrylates and methacrylates and one or more monomers, oligomers, or polymers having a siloxane backbone and containing acrylate functional moieties. The most preferred acrylate and methacrylate compounds include methyl acrylate, ethyl acrylate, 2-hydroxyethyl acrylate, 4 hydroxyethyl acrylate, 2-carboxyethyl acrylate, ethyleneglycolmethyl ether acrylate, 2,2,2 trifluorethyl acrylate, methylmethacrylate, butylmethacrylate, 2-ethylhexylmethacrylate, isobornylmethacrylate, tetrahydrofurfuryl methacrylate, and cyclohexylmethylmethacrylate.

In some embodiments the adhesive compositions of the invention may further comprise an effective amount of a compound that is reactive with an amine so as to liberate the organoborane so as to initiate polymerization (a decomplexing agent). The amine reactive compound liberates organoborane by reacting with the amine, thereby removing the organoborane from chemical attachment with the amine. Desirable amine reactive compounds are those materials that can readily form reaction products with amines at or below and more preferably at room temperature, 20° C. to 22° C., so as to provide a composition that can be generally easily used and cured under ambient conditions. General classes of such compounds include acids, aldehydes, isocyanates, acid chlorides, sulphonyl chlorides, mixtures thereof. In one embodiment preferred amine reactive compounds are acids. Both Bronstead and Lewis acids may be used. Pocius, U.S. Pat. No. 5,718,977 describes the preferred acid compounds at column 9, line 1 to 15. The most preferred acids are acrylic acid and methacrylic acid.

In another preferred embodiment the adhesive compositions of the present invention further comprise an effective amount of an isocyanate containing compound (a decomplexing agent) that is reactive with the complexed amine so as to liberate the organoborane and to initiate polymerization. The amine reactive compound liberates organoborane by reacting with the amine, thereby removing the organoborane from chemical attachment with the amine. The isocyanate containing compounds react with the amine present in the composition to form a urea, polyurea or polyurethane/urea phase. When an excess of isocyanate containing compound is used, little or no free amine is present in the resulting product. By eliminating the presence of free amine the plasticizing impact of the amine is prevented. Further the urea or polyurea present improves the heat resistance of the resulting product.

The isocyanate containing compound (if used) can be any isocyanate compound that decomplexes the organoborane amine complex. Preferably the isocyanate is a polyisocyanate having nominally 2 or greater isocyanate moieties per compound. Isocyanate compounds useful are disclosed in U.S. Pat. No. 5,872,197. Among more preferred isocyanate containing compounds are polymeric versions of methylene diphenyl diisocyanate, isophorone diisocyanate, hexamethylene diisocyanate, toluene diisocyanate, isomers or bis isocyanatomethyl cyclohexane, tetramethylxylyl diisocyanate.

Preferably the amount of urea or polyurea present in the resulting polymerized product is 5 percent by weight or greater, more preferably 10 percent or greater, and most preferably 15 percent or greater. Preferably the amount of polyurea present in the resulting polymerized product is 50 percent or less, more preferably 45 percent or less and most preferably 40 percent or less. Percent urea means the percent by weight of the urea/urethane phase in the final product. This can be generally determined by adding the weight of the isocyanate and amine (and any other isocyanate reactive compounds present) and dividing this sum by the total weight of the ingredients.

In another embodiment the adhesive is a two part curable adhesive comprising a first part comprising a polymerizable compound capable of free radical polymerization and a second part comprising the organoborane amine complex and one or more unpolymerized or partially polymerized compounds having ring opening heterocyclic moieties. In a preferred embodiment the ring opening polymerization of heterocyclic compounds is initiated by contacting the heterocyclic compounds with a Lewis acid catalyst. The two portions can be miscible, partially miscible or immiscible. In a preferred embodiment the polymerizable composition comprises two phases, one based on the compounds which polymerize through olefinic bonds and a second which polymerizes by a ring opening reaction of a heterocyclic moiety. The cured compositions of the invention preferably contain two regions that in many cases are not miscible. In some embodiments the two regions are separate phases or are interpenetrating networks of two different polymers. The two regions can be chemically bonded to one another if the composition includes a crosslinking compound.

The compound containing a heterocyclic ring opening moiety can be any monomer, oligomer or prepolymer containing a heterocyclic moiety capable of ring opening and polymerization. The heteroatom in the heterocyclic moiety is preferably nitrogen, oxygen or sulfur, with nitrogen and oxygen being preferred and oxygen being most preferred. Preferably the heterocyclic moiety is a 3 membered ring. Preferred heterocyclic moieties are oxirane and aziridine moieties, with oxirane moieties being most preferred. Examples of such oxirane containing materials are diglycidylether of bisphenol A, tris 2-3-epoxypropylisocyanurate, tetraphenylolethane glycidylether, poly(phenyl glycidylether-co-formaldehyde), poly(phenyl glycidylether-co-dicyclopentadiene, and trimethylopropane triglycidyl ether, any other glycidyl modified aliphatic oxirane containing material, tetraglycidylmethyleneaniline, glycidylether modified poly(dimethylsiloxane), and any other glycidyl ether, glycidyl ester or glycidyl amine. Aziridine, as used herein, is refers to a three membered ring having a nitrogen in the ring. Examples of useful aziridine containing molecules are trimethylolpropane tris[2-methyl-1-aziridinepropionate], pentaerythritol tris[3-(1-aziridinyl)propionate], 2,4,6-Tris-aziridin-1-yl-(1,3,5)triazine, 2,3 diphenylaziridine, and 1-butyrylaziridine.

The adhesive compositions of the present invention may comprise one or more compounds, oligomers or prepolymers having a siloxane backbone and reactive moieties capable of polymerization and optionally a catalyst for the polymerization of the one or more compounds, oligomers or prepolymers having a siloxane backbone and reactive moieties capable of polymerization.

Alternatively, the adhesive suitable for use in the present invention is a one part composition comprising an organoborane amine complex; one or more of monomers, oligomers or polymers having olefinic unsaturation which is capable of polymerization by free radical polymerization; and a compound which has siloxane groups in its backbone and contains a moiety which when exposed to moisture releases an acid capable of decomplexing the organoborane amine complex. This composition can be polymerized by exposing the composition to atmospheric moisture under conditions such that part decomposes to form an acid, which causes the organoborane amine complex to disassociate and initiate polymerization.

The compounds, oligomers or prepolymers having a siloxane backbone and reactive moieties capable of polymerization useful in this invention include any compound, oligomer or prepolymer containing siloxane units in the backbone and which have reactive groups which can polymerize under reasonable reaction conditions. Oligomer as used herein means a few identifiable chemical units linked together through reactive moieties. Oligomer can be thought of as a small polymer having only a few units, for instance a dimer, trimer, tetramer or pentamer. Mer is used to refer to one of the basic identifiable chemical units of a oligomer or polymer and often is the residue of the compound or compounds from which the oligomer or polymer is derived. Prepolymer means compounds having several basic identifiable chemical units which comprise the polymer, that is, several mers, which also have reactive groups which allow the compounds to further react. In practice, a prepolymer is a mixture of polymers having varying numbers of basic identifiable chemical units of the polymer and may contain some amount of oligomers. The term having a siloxane backbone means herein that the backbone of the compounds, oligomers and/or polymers contains basic identifiable chemical units having silicone and oxygen atoms in the backbone. Preferably the basic identifiable chemical units of siloxane correspond to the formula

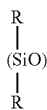

wherein R is separately in each occurrence hydrogen, alkyl, alkenyl, aryl, alkaryl, or aralkyl having up to 20, preferably up to 8, carbon atoms and where R is not equal to hydrogen it can further comprise one or more reactive moieties capable of polymerization. The term reactive moieties capable of polymerization mean any moieties which react with one another or with other reactive moieties to form oligomers, prepolymers or polymers. Examples of preferred reactive moieties capable of polymerization include vinyl moieties, hydrolyzable moieties, hydroxyl moieties, hydrides, isocyanate moieties, amines or in the case of cyclic siloxanes is the reactive end formed by ring opening. More preferred reactive moieties capable of polymerization include vinyl moieties, hydrolyzable moieties, hydroxyl moieties, hydrides. Where two or more reactive moieties capable of polymerization are present per reactive silicon group, they may be the same or different.

One class of siloxane polymers which are useful in the practice of this invention include vinyl functionalized siloxanes which may be further polymerized via free radical or addition mechanisms. Vinyl functionalized siloxanes comprise compounds, oligomers, and prepolymers which have siloxane units in the backbone and have polymerizable olefinic moieties. The vinyl functionalized siloxanes may contain hydrocarbylene and/or fluorocarbylene units in the backbone.

Another class of siloxane containing compounds, oligomers or prepolymers useful in this invention are siloxanes having terminal silanol groups or hydrolyzable groups which upon exposure to moisture form silanol groups. Terminal silanol groups on siloxane chains allow the compounds, oligomers or prepolymers react via condensation when catalyzed. These reactions proceed at room temperature as either a one part or two-part polymerization system. This reaction occurs at room temperature in the presence of silanol condensation catalysts. Silanol condensation catalysts are well known in the art.

The adhesive compositions may further comprise additional additives such as thickeners, preferably a medium to high (10,000 to 1,000,000) molecular weight polymethyl methacrylate; an elastomeric material, such as chlorinated or chlorosulphonated polyethylenes, block copolymers of styrene and conjugated dienes and certain graft copolymer resins such as particles that comprise rubber or rubber-like cores or networks that are surrounded by relatively hard shells, these materials often being referred to as "core-shell" polymers; cross-linking agents; peroxides; inhibitors; colorants; fillers; solvents, etc. The adhesive composition may also contain a reactive or nonreactive diluent to balance the volumes of the two parts of the composition so as to achieve a commercially acceptable volumetric ratio of the two components. It may also be desirable to add solvents, such as methyl ethyl ketone, ethyl acetate, propyl acetate and methylene chloride, in order to improve wetting and/or to balance the volatility such that evaporation is optimized without the materials being overly offensive.

Prior to joining a substrate and an object, the joining surfaces may be treated by means such as corona, flame, sulfonation, plasma However, in the present invention surface treatment of the joining surfaces may not be required prior to joining.

Any object is suitable which provides adequate surface area to allow for joining the object to the substrate by the method of the present invention. For example, the substrate may be a complete roofing membrane or a repair patch which may be joined to a roof in need of repair. It should be understood that materials may interchangeable be considered to be either the object or the substrate and no significance is intended by such designation. For example, a roof may be considered to be either the substrate or the object when bonded to a membrane.

Preferably the adhesive compositions of the present invention have VOC emissions of equal to or less than 650 grams per liter (g/l), preferably equal to or less than 520 g/l, more preferably equal to or less than 510 g/l, even more preferably equal to or less than 490 g/l, even more preferably equal to or less than 400 g/l, even more preferably equal to or less than 285 g/l, even more preferably equal to or less than 270 g/l, even more preferably equal to or less than 250 g/l, and most preferably equal to or less than 17 g/l.

It is anticipated that the substrate will remain bonded (i.e. there will be no adhesive failure) to the object for at least thirty years when using the method of the present invention. For roofing systems this means that the membrane is expected to be bonded to the roof for at least 30 years under atmospheric conditions (temperature range of −40° C. to 90° C. and relative humidity from 0-100 percent).

While specific embodiments of the invention have been shown and described in detail to illustrate the inventive principles, it will be understood that the invention may be embodied otherwise without departing from such principles.

The invention claimed is:

1. A method for joining a substrate having a first surface to an object having a second surface comprising the steps of:
   (i) applying an effective amount of a curable adhesive composition to the first surface of the substrate, the second surface of the object or to both surfaces, wherein the adhesive comprises
      (a) an effective amount of a organoborane amine complex initiator and (b) one or more monomers, oligomers, polymers or mixtures thereof having olefinic unsaturation which is capable of polymerization by free radical polymerization and (ii) contacting the first surface of the substrate with the second surface of the object;

wherein the organoborane amine complex initiator has the structure

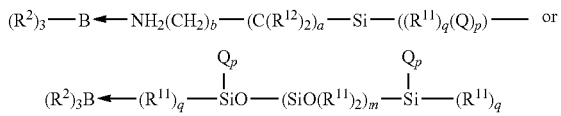

wherein

B represents Boron;

$R^2$ is separately in each occurrence $C_{1-10}$ alkly, $C_{3-10}$ cycloalkyl, two or more of $R^2$ may combine to form a cycloaliphatic ring;

Q is a hydrolyzable moiety;

$R^{11}$ is independently in each occurrence hydrogen, alkyl, alkoxy, alkenyl, alkyl amino or corresponds to the formula $((CR^{14}H)_rO)_n$—$(NR^4)$—$(CH_2)_o$—$NH_2$ with the proviso that at least $(R^{11})'$ is a primary amine leave this as is;

$R^{12}$ is independently in each occurrence hydrogen, alkyl, aryl, alkoxy, and may further contain one or more primary, secondary or tertiary amines;

$R^{14}$ is separately in each occurrence hydrogen or alkyl;

$R^4$ is hydrogen, $C_{1-10}$ alkyl, $C_{6-10}$ aryl or $C_{7-10}$ alkaryl;

a is a number of form 1 to 10;

b is a number of from 0 to 1;

m is separately in each occurrence a whole number of 1 or greater;

p is separately in each occurrence a number of from 1 to 3;

q is separately in each occurrence an integer from 1 to 2 wherein the sum of p and q on each silicon atom is 3;

n is separately in each occurrence an integer of about 4 to about 400;

o is separately in each occurrence an integer of about 1 to about 9; and r is separately in each occurrence an integer of 2 4.

2. The method of claim 1 wherein the substrate is a roofing membrane.

3. The method of claim 1 wherein the substrate and the object independently comprise a metal, a multilayer plastic, a multilayer composite, a thermoplastic, a thermoset; or combinations thereof.

4. The method of claim 1 wherein the substrate and object are thermoplastic.

5. The method of claim 1 wherein the substrate and the object independently comprise a polyolefin; acrylonitrile, butadiene and styrene terpolymer; polyvinyl chloride; chlorinated polyvinyl chloride; chlorinated/sulfonated polyethylene; ethylene/alpha-olefin/diene terpolymers; or blends thereof.

6. The method of claim 1 wherein the substrate and the object comprise propylene polymers.

7. The method of claim 1 wherein the substrate and the object comprise ethylene polymers.

8. The method of claim 1 wherein the substrate is a first thermoplastic and the object is a second thermoplastic different from the first thermoplastic.

9. The method of claim 1 wherein the adhesive further comprises:

an effective amount of an isocyanate containing compound; one or more unpolymerized or partially polymerized compound having ring opening heterocyclic moieties and optionally a Lewis acid catalyst capable of initiating polymerization of the compound containing heterocyclic moieties; one or more compound, oligomer or prepolymer having siloxane groups and reactive moieties in its backbone capable of polymerization; one or more compound, oligomer or prepolymer having siloxane groups in its backbone which contain a moiety which when exposed to moisture forms an acid capable of decomplexing the organoborane amine complex; or mixtures thereof.

10. The method of claim 1 wherein the adhesive comprises a polymerizable acrylate monomer.

11. The method of claim 1 wherein the adhesive has a VOC emission of less than 650 g/l.

12. The method of claim 1 wherein the adhesive has a VOC emission of less than 270 g/l.

13. The method of claim 1 wherein the adhesive further comprises a liquid.

14. The method of claim 13 wherein the liquid comprises water.

15. The method of claim 1 further comprising the step of applying an effective amount of pressure to the substrate /adhesive/object in order for the adhesive to cure.

16. The method of claim 1 further comprising the step of exposing the adhesive to air for a sufficient amount of time to develop green strength of the adhesive prior to step (ii).

17. The method of claim 1 wherein the curable adhesive compound is a one part compound.

18. The method of claim 1 wherein the curable adhesive compound is a two part compound.

19. The method of claim 1, further comprising the step of ensuring that the first and second surfaces contain substantially no water prior to step (i).

20. The method of claim 1, further comprising the step of ensuring that the first and second surfaces are substantially oil-free prior to step (i).

21. A method to repair a new or existing substrate, object, or substrate/object joint having one or more surface in need of repair comprising the steps of (i) applying an effective amount of a curable adhesive composition to the surface(s) in need of repair, a repair patch or both the surface in need of repair and the repair patch, wherein the adhesive comprises (a) an effective amount of a organoborane amine complex initiator and (b) one or more monomers, oligomers, polymers or mixtures thereof having olefinic unsaturation which is capable of polymerization by free radical polymerization;

and (ii) bonding a repair patch to the surface in need of repair;

wherein the organoborane amine complex initiator has the structure

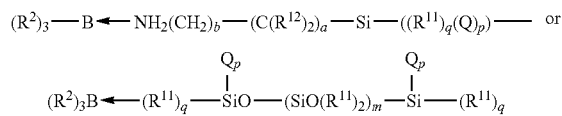

wherein

B represents Boron;

$R^2$ is separately in each occurrence $C_{1-10}$ alkyl, $C^{3-10}$ cycloalkyl, or two or more of $R^2$ may combine to form a cycloaliphatic ring;

Q is a hydrolyzable moiety;

$R^{11}$ is independently in each occurrence hydrogen, alkyl, alkoxy, alkenyl, alkyl amino or corresponds to the formula $((CR^{14}H)_r-(NR^4)-(CH_2)_o-NH_2$ with the proviso that at least $(R^{11})'$ is a primary amine leave this as is;

$R^{12}$ is independently in each occurrence hydrogen, alkyl, aryl, alkoxy, and may further contain one or more primary, secondary or tertiary amines;

$R^{14}$ is separately in each occurrence hydrogen or alkyl;

$R^4$ is hydrogen, $C_{1-10}$ alkyl, $C_{6-10}$ aryl or $C_{7-10}$ alkaryl;

a is a number of form 1 10;

b is a number of from 0 to 1;

m is separately in each occurrence a whole number of 1 or greater;

p is separately in each occurrence a number of from 1 to 3;

q is separately in each occurrence an integer from 1 to 2 wherein the sum of p and q on each silicon atom is 3;

n is separately in each occurrence an integer of about 4 to about 400;

o is separately in each occurrence an integer of about 1 to about 9; and r is separately in each occurrence an integer of 2 or 4.

22. A substrate having a first surface bonded to an object having a second surface, wherein the bond comprises:
(i) an effective amount of a curable one or two part adhesive composition to the first surface of the substrate, the second surface of the object or to both surfaces, wherein the adhesive comprises
(a) an effective amount of a organoborane amine complex initiator and
(b) one or more monomers, oligomers, polymers or mixtures thereof having olefinic unsaturation which is capable of polymerization by free radical polymerization;
wherein the organoborane amine complex initiator has the structure

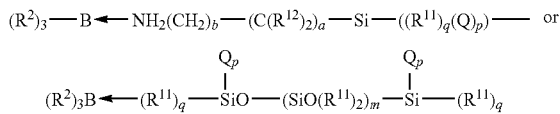

wherein

B represents Boron;

$R^2$ is separately in each occurrence $C_{1-10}$ alkyl, $C_{3-10}$ cycloalkyl, or two or more of $R^2$ may combine to form a cycloaliphatic ring;

Q is a hydrolyzable moiety;

$R^{11}$ is independently in each occurrence hydrogen, alkyl, alkoxy, alkenyl, alkyl amino or corresponds to the formula $((CR^{14}H)_r\ O)_n-(CH_2)_o-NH_2$ with the proviso that at least $(R^{11})'$ is a primary amine leave this as is;

$R^{12}$ is independently in each occurrence hydrogen, alkyl, aryl, alkoxy, and may further contain one or more primary, secondary or tertiary amines;

$R^{14}$ is separately in each occurrence hydrogen or alkyl;

$R^4$ is hydrogen, $C_{1-10}$ alkyl, $C_{6-10}$ aryl or $C_{7-10}$ alkaryl;

a is a number of form 1 10;

b is a number of from 0to 1;

m is separately in each occurrence a whole number of 1 or greater;

p is separately in each occurrence a number of from 1 to 3;

q is separately in each occurrence an integer from 1 to 2 wherein the sum of p and q on each silicon atom is 3;

n is separately in each occurrence an integer of about 4 to about 400;

o is separately in each occurrence an integer of about 1 to about 9; and r is separately in each occurrence an integer of 2 or 4.

* * * * *